United States Patent
Iyer et al.

(10) Patent No.: US 10,740,918 B2
(45) Date of Patent: Aug. 11, 2020

(54) ADAPTIVE SIMULTANEOUS LOCALIZATION AND MAPPING (SLAM) USING WORLD-FACING CAMERAS IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Yagiz Can Yildiz, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 147 days.

(21) Appl. No.: 16/129,532

(22) Filed: Sep. 12, 2018

(65) Prior Publication Data

US 2020/0082555 A1    Mar. 12, 2020

(51) Int. Cl.
  *G06T 7/579*   (2017.01)
  *G06T 19/00*   (2011.01)
  *G06T 7/70*    (2017.01)

(52) U.S. Cl.
  CPC ............... *G06T 7/579* (2017.01); *G06T 7/70* (2017.01); *G06T 19/006* (2013.01); *G06T 2207/20012* (2013.01)

(58) Field of Classification Search
  CPC ......... G06T 7/579; G06T 19/006; G06T 7/70; G06T 2207/20012
  See application file for complete search history.

(56) References Cited

U.S. PATENT DOCUMENTS

| | | | |
|---|---|---|---|
| 2014/0145914 A1* | 5/2014 | Latta | G06F 3/013 345/8 |
| 2014/0225918 A1* | 8/2014 | Mittal | G02B 27/017 345/633 |
| 2014/0361976 A1* | 12/2014 | Osman | G02B 27/0172 345/156 |
| 2018/0272231 A1* | 9/2018 | Katoh | A63F 13/211 |

OTHER PUBLICATIONS

Distributed Monocular SLAM for Indoor Map building (Year: 2017).*
SLAM for dummies (Year: 2004).*
(Continued)

*Primary Examiner* — Nizar N Sivji
(74) *Attorney, Agent, or Firm* — Fogarty LLP

(57) ABSTRACT

Systems and methods for adaptive Simultaneous Localization and Mapping (SLAM) using world-facing cameras in virtual, augmented, and mixed reality (xR) applications. An Information Handling System (IHS) may include a processor and a memory coupled to the processor, the memory having program instructions stored thereon that, upon execution, cause the IHS to: select at least one region-of-interest (ROI) within an image captured by a camera mounted on a Head-Mounted Display (HMD) worn by a user in a physical environment during execution of a virtual, augmented, or mixed reality (xR) application; and manage utilization of an IHS resource, at least in part, by creating a map of the physical environment and tracking a location of the HMD using the at least one ROI to the exclusion of another portion of the image.

20 Claims, 6 Drawing Sheets

(56) References Cited

OTHER PUBLICATIONS

Mark Spoonauer, "HTC Vive Pre Adds Front Camera to Blend VR, Real World," Jan. 5, 2016, pp. 5, retrieved Sep. 12, 2018, available at https://www.tomsguide.com/us/htc-vive-pre-hands-on,news-21980.html.

Zia et al., "Comparative Design Space Exploration of Dense and Semi-Dense SLAM," Mar. 3, 2016, pp. 9, retrieved Sep. 12, 2018, available at https://arxiv.org/pdf/1509.04648.pdf.

Tang et al., "Embedded Systems Architecture for SLAM Applications," pp. 4, retrieved Sep. 12, 2018, available at https://arxiv.org/ftp/arxiv/papers/1702/1702.01295.pdf.

Fernández-Caballero et al., "Thermal-Infrared Pedestrian ROI Extraction through Thermal and Motion Information Fusion," Sensors, ISSN 1424-8220, 14, 6666-6676; doi:10.3390/s140406666, 2014, pp. 6666-6676, retrieved Sep. 12, 2018, available at http://www.mdpi.com/1424-8220/14/4/6666/pdf.

* cited by examiner ured by a camera mounted on a Head-Mounted Display (HMD) worn by a user in a physical environment during execution of an xR application; and manage utilization of an IHS resource, at least in part, by creating a map of the physical environment and tracking a location of the HMD using the at least one ROI to the exclusion of another portion of the image.

ADAPTIVE SIMULTANEOUS LOCALIZATION AND MAPPING (SLAM) USING WORLD-FACING CAMERAS IN VIRTUAL, AUGMENTED, AND MIXED REALITY (XR) APPLICATIONS

FIELD

The present disclosure generally relates to Information Handling Systems (IHSs), and, more particularly, to systems and methods for adaptive Simultaneous Localization and Mapping (SLAM) using world-facing cameras in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for adaptive Simultaneous Localization and Mapping (SLAM) using world-facing cameras in virtual, augmented, and mixed reality (xR) applications are described. In an illustrative, non-limiting embodiment, an Information Handling System (IHS) may include a processor and a memory coupled to the processor, the memory having program instructions stored thereon that, upon execution, cause the IHS to: select at least one region-of-interest (ROI) within an image captured by a camera mounted on a Head-Mounted Display (HMD) worn by a user in a physical environment during execution of an xR application; and manage utilization of an IHS resource, at least in part, by creating a map of the physical environment and tracking a location of the HMD using the at least one ROI to the exclusion of another portion of the image.

In some implementations, the ROI may include a plurality of ROIs selected to maintain the utilization of the IHS resource below a predetermined value. The plurality of ROIs may be selected based upon a calibration curve or table that associates a reduction in a number of ROIs with a corresponding reduction in utilization of the IHS resource.

The program instructions, upon execution, may cause the IHS to: identify an increase in utilization of the IHS resource; and reduce the number of ROIs to avoid reaching a maximum utilization level. For example, the plurality of ROIs may be selected based upon a calibration curve or table that associates an increase in a number of ROIs with a corresponding increase in utilization of the IHS resource. Additionally, or alternatively, the program instructions, upon execution, may cause the IHS to: identify a decrease in utilization of the IHS resource; and increase the number of ROIs without reaching a maximum utilization level.

In other implementations, the ROI may include a plurality of pixels selected to maintain the utilization of the IHS resource below a predetermined amount. The plurality of pixels may be selected based upon a calibration curve or table that associates a reduction in the number of pixels with a corresponding reduction in utilization of the IHS resource.

The program instructions, upon execution, may cause the IHS to: identify an increase in utilization of the IHS resource; and reduce the number of pixels of the at least one ROI to avoid reaching a maximum utilization level. The plurality of pixels may be selected based upon a calibration curve or table that associates an increase in the number of pixels with a corresponding increase in utilization of the IHS resource. Additionally, or alternatively, the program instructions, upon execution, may cause the IHS to: identify a decrease in utilization of the IHS resource; and increase the number of pixels of the at least one ROI without reaching a maximum utilization level.

In another illustrative, non-limiting embodiment, a method may include: during a calibration operation, selecting one or more ROIs within an image; monitoring utilization of a resource while an IHS performs a SLAM process on the one or more ROIs; and modifying a number of the one or more ROIs used while the IHS performs the SLAM process to store a calibration curve or table that associates different numbers of ROIs with a level of utilization of the resource.

The method may also include, in normal operation, using a selected number of ROIs that results in a selected level of utilization of the resource based upon the calibration curve or table. The method may include, in normal operation, identifying an increase in the level of utilization of the resource; and reducing the number of one or more ROIs used to avoid reaching a maximum level. Additionally, or alternatively, the method may include, in normal operation, identifying a decrease in the level of utilization of the resource; and increasing the number of one or more ROIs used without reaching the maximum level.

The method may include, during the calibration operation, modifying a number of pixels within each of the one or more ROIs, and storing another calibration curve or table that associates different sizes of each ROI with a level of utilization of the resource. In this case, the method may include, in normal operation, using a selected number of pixels for each of the one or more ROIs that results in a selected level of utilization of the resource based upon the calibration curve or table.

The method may also include, in normal operation, identifying an increase in the level of utilization of the resource; and reducing the size of each of the one or more ROIs to avoid reaching a maximum resource utilization level. The method may further include identifying a decrease in the level of utilization of the resource; and increasing the size of each of the one or more ROIs without reaching the maximum resource utilization level.

In yet another illustrative, non-limiting embodiment, a hardware memory device may have program instructions stored thereon that, upon execution by a processor of an IHS, cause the IHS to, during calibration, create a calibration curve or table by monitoring utilization of a resource while performing a SLAM operation based upon one or more ROIs selected within an image captured by a camera in a physical environment; and in normal operation subsequent to the calibration, in response to the utilization changing over time, select least one of: (a) a different number of the one or more ROIs; or (b) a different size of each of the one or more ROIs.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for adaptive Simultaneous Localization and Mapping (SLAM) using world-facing cameras in virtual, augmented, and mixed reality (xR) applications. These techniques are particularly useful in xR applications that employ HMDs, Heads-Up Displays (HUDs), and eyeglasses—collectively referred to as "HMDs."

Figure 1:
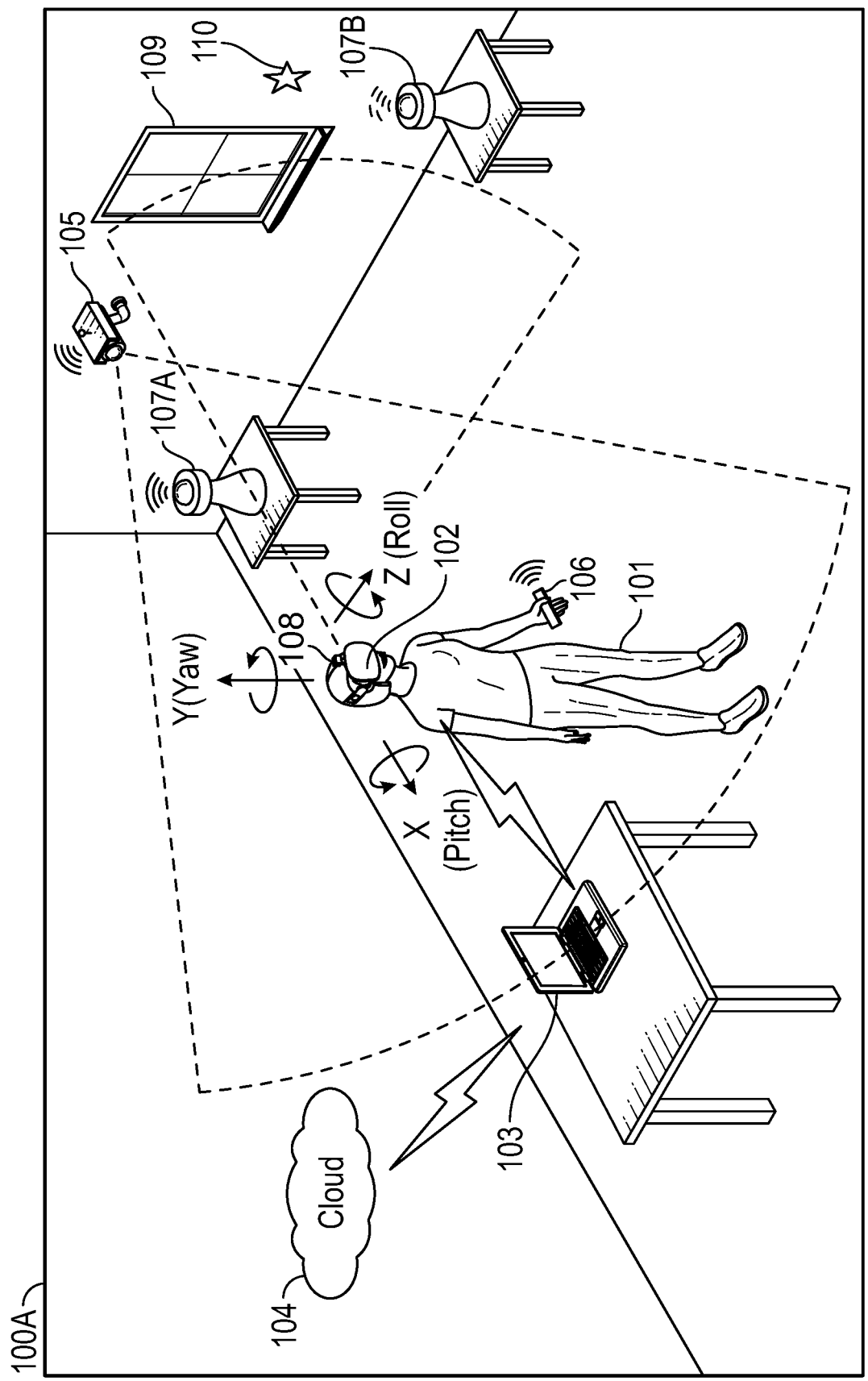
FIG. 1 illustrates an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective. In other embodiments, however, HMD 102 may be an All-In-One (MO) device where all processing is done by HMD 102 itself (i.e., host IHS 103/HMD 102 may be combined).

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 2:
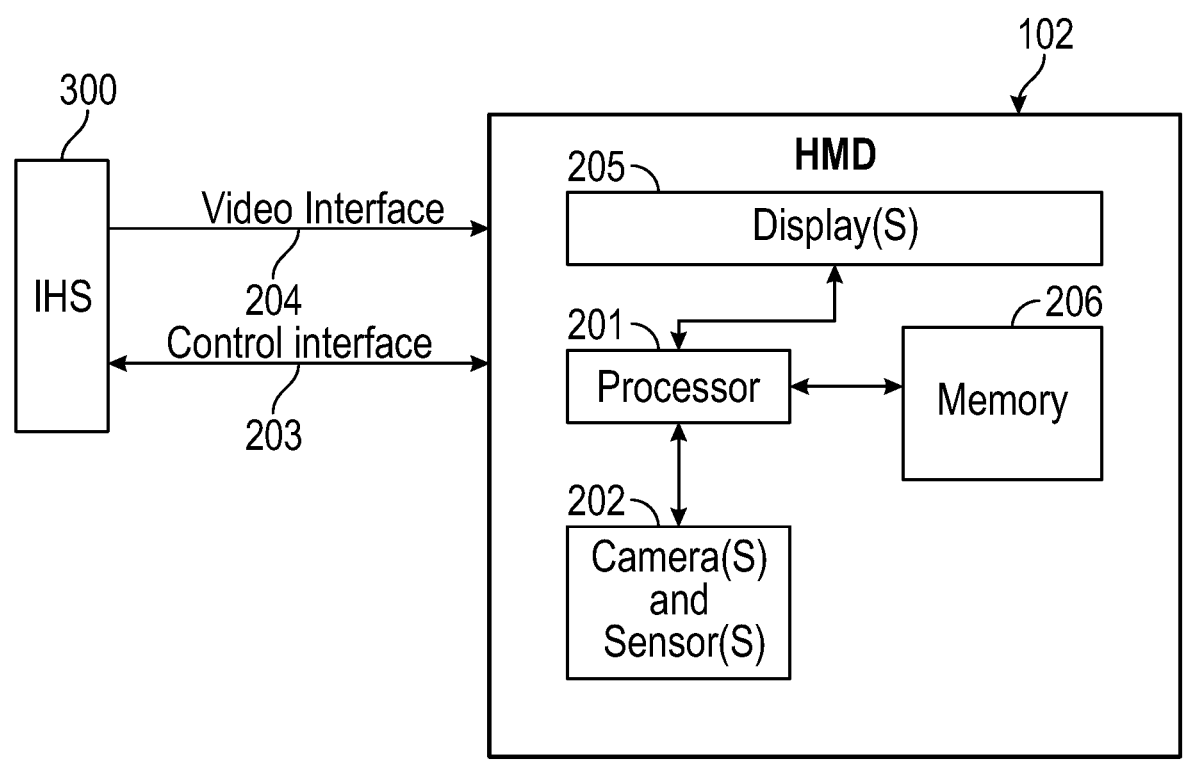
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out or world-facing cameras, eye tracking cameras, RGB cameras, IR cameras, near-IR (NIR) cameras, etc. Meanwhile, examples of sensor(s) 202 include, but are not limited to: electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub, multiplexer, or the like.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide a communication channel between HMD 102 and IHS 300 to facilitate execution of an xR application. For example, program instructions stored in memory 206, when executed by controller 201, may cause video frames captured by world-facing camera(s) 202 to be transmitted to IHS 300 via control interface 203.

IHS 300 may in turn execute SLAM module 403 (FIG. 4), for example, based upon landmarks extracted from video frames received from HMD 102 (or from outside-in camera 105). Particularly, SLAM module 403 may be configured to implement tracking techniques that use distinctive visual characteristics of the physical environment to identify specific images or shapes which are then usable to calculate HMD 102's position and orientation within environment 100. Then, rendering engine 406 (FIG. 4) may use data from SLAM module 403 to render an image to be provided to display(s) 205 via video interface 204 (e.g., HDMI, DVI, DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
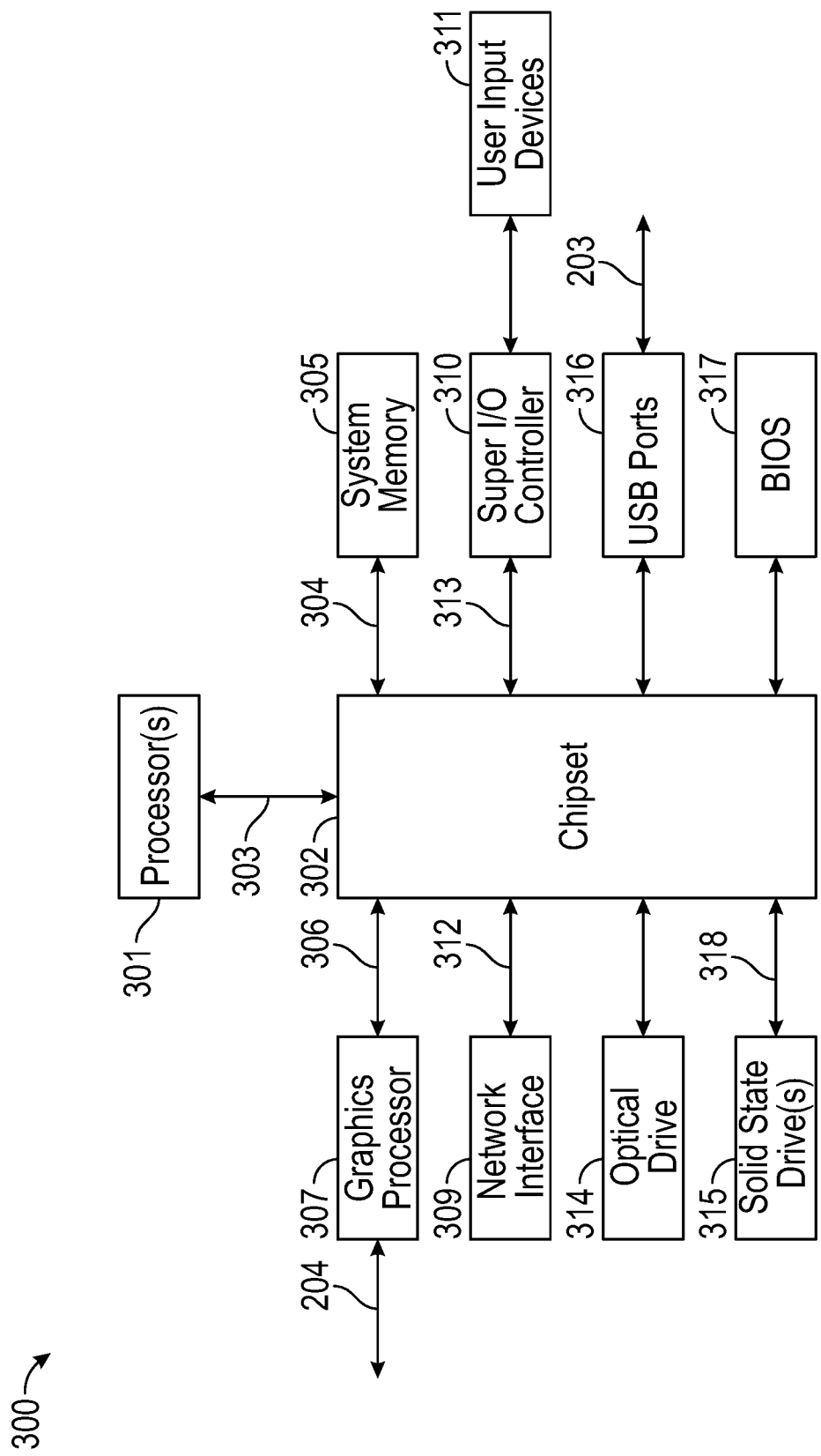
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connected to processor(s) 301. In certain embodiments, chipset 302 may utilize Quick-Path Interconnect (QPI) bus 303 for communicating with processor(s) 301. Chipset 302 provides processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of the IHS 300. Graphics processor 307 may be coupled to chipset 302 via graphics bus 306 such as provided by an Accelerated Graphics Port (AGP) bus or a Peripheral Component Interconnect Express (PCIe) bus. In certain embodiments, graphics processor 307 generates display signals and provides them to HMD 102 via video interface 204 (e.g., HDMI, DVI, DISPLAYPORT, etc.).

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to super I/O controller 310 via a Low Pin-Count (LPC) bus 313.

Other resources may also be coupled to processor(s) 301 of IHS 300 through chipset 302. In certain embodiments, chipset 302 may be coupled to network interface 309, such as provided by a Network Interface Controller (MC) that is coupled to IHS 300. In certain embodiments, network interface 309 may be coupled to chipset 302 via PCIe bus 312. According to various embodiments, network interface 309 may support communication via various wired and/or wireless networks. In certain embodiments, chipset 302 may also provide access to one or more Universal Serial Bus (USB) ports 316; which in some implementations may serve as transport for establishing control interface 203 with HMD 102.

Chipset 302 also provides access to one or more solid-state storage devices 315. Chipset 302 utilizes PCIe bus interface connection 318 in order to communication with the solid-state storage device 315. In certain embodiments, chipset 302 may also provide access to other types of storage devices. For instance, in addition to the solid-state storage device 315, IHS 300 may also utilize one or more magnetic disk storage devices, or other types of the storage devices such as an optical drive or a removable-media drive. In various embodiments, solid-state storage device 315 may be integral to IHS 300, or may be located remotely from IHS 300.

Another resource that may be accessed by processor(s) 301 via chipset 302 is Basic Input/Output System (BIOS) 317. Upon powering or restarting IHS 300, processor(s) 301 may utilize BIOS 317 instructions to initialize and test hardware components coupled to the IHS 300 and to load an operating system for use by the IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to the IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by illustrated components may instead be provided by components integrated into the one or more processor(s) as a system-on-a-chip (SOC) or the like.

Figure 4:
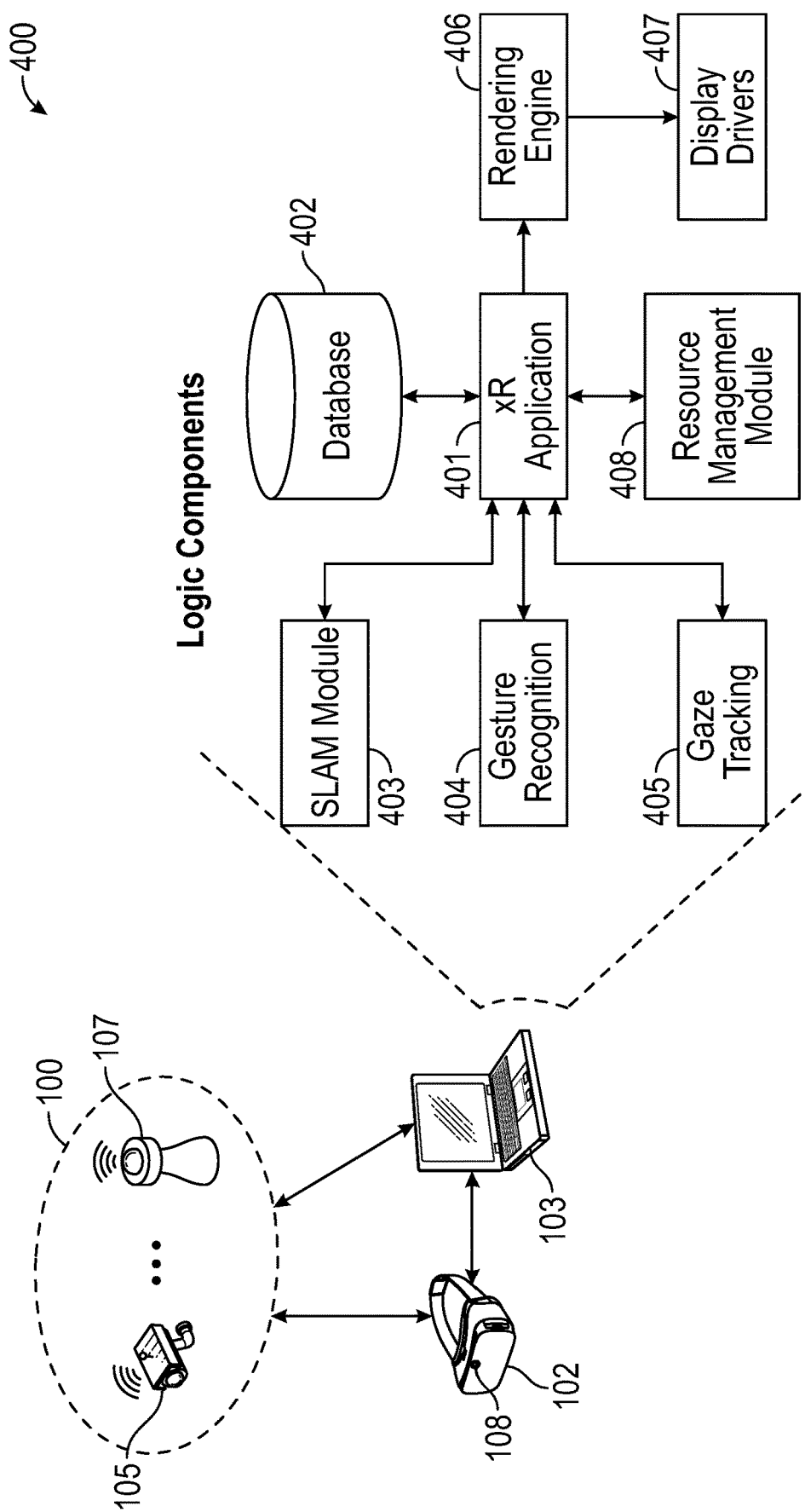
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, therapy, education and training, military uses, occupational safety, engineering, industrial product design, collaboration applications, virtual meetings, etc. These applications may be provided, at least in part, through the execution of program instructions stored, for example, in system memory 305 of host IHS 103.

In operation, SLAM module 403 uses positional tracking devices among camera(s) and sensor(s) 202 to construct a map of an unknown environment where HMD 102 is located, and that simultaneously identifies where HMD 102 is located, its orientation, and/or pose.

Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100 and/or one or more totems 106 (e.g., any UI device, such as a pointer, a DELL dial totem, or the like) or tags 110 (e.g., any passive or active object) that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, world-facing (WF) camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In other cases, markerless inside-out tracking may use continuous searches and feature extraction techniques from video frames obtained by WF camera 108 (e.g., using visual odometry) to find visual landmarks (e.g., window 109) in environment 100.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., WF camera 108 observes landmarks in the environment that have been previously mapped). In other cases, a map of environment 100 may be obtained, at least in part, from cloud 104.

Gesture recognition module 404 may use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when RGB video frame data (e.g., a video or depth-video stream) is received at host IHS 103 from WF camera 108 (or another dedicated gesture camera) of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using WF camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-gaze-interest (ROGI) of configurable size or shape (e.g., circular, rectangular, etc.) based upon the gaze vector, point, and/or direction.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Resource management module 408 may be configured to manage hardware resources of HMD 102 and/or host IHS 103, at least in part, by controlling one or more parameters, inputs, and/or outputs of logic components 400. In various implementations, resource management module 408 may execute a calibration procedure (FIG. 5) and maintain the steady-state operation (FIG. 6) of the various systems and methods described herein.

For example, in operation, resource management module 408 may cause HMD 102 to select one or more ROIs from a video frame captured using camera 108. To select an ROI ("ROI segmentation"), controller 201 may receive images from camera(s) 108, and it may apply one or more feature extraction techniques to produce or identify the coordinates of a rectangularly shaped ROI having X*Y pixels, which shows or represents the most amount of movement in that image. Examples of suitable feature extraction techniques include, but are not limited to: thresholding methods, background modeling and subtraction methods, layer techniques, or saliency-based methods.

For instance, in an implementation that uses images captured with WF camera 108 that operates in the visible or color spectrum, to perform ROI segmentation, in response to receiving a command from resource management module 408, controller 201 may select a set of moving points, within a sub-grid, of image pixels. A multi-cue descriptor may be associated with each of these points. Clusters of points may then be formed, for instance, using a variable-bandwidth, mean-shift techniques. Finally, segmentation of objects and/or landmarks associated with a given cluster may be performed using graphical parsing methods, or the like.

Conversely, in an implementation that uses images captured with WF camera 108 that operates in the IR spectrum, to perform ROI segmentation, in response to receiving a command from resource management module 408, controller 201 may perform thermal analysis (e.g., such that the IR image is binarized in accordance with a threshold with the aim of isolating the heat blobs, producing a first list of ROIs) combined with motion analysis (e.g., producing a second list of ROIs) using data fusion techniques to sum up or overlap the ROIs in the first and second lists, to assemble a unique list of ROIs.

Database 402 may include if/then rules with respect to ROIs and hardware resource utilization. For example, a resource utilization rule may indicate a maximum utilization level for a corresponding hardware resource. In addition, database 402 may include a plurality of curves or tables obtained during a calibration phase. In some cases, database 402 may include different rules based upon the identity of an authenticated user, for example, as part of a profile. Additionally, or alternatively, rules may be based upon historical usage.

Still referring to FIG. 4, most manufacturers have minimum required hardware specifications (e.g., CPU, GPU, memory, etc.) for execution of an xR application, and SLAM module 403 has large compute and memory utilization needs. Even when a capable host IHS 103 is used, it may execute applications outside the xR process (or a particular portion of the xR process) that consume more hardware resources at different times.

To address these, and other issues, HMD 102 and/or host IHS 103 may be configured to scale SLAM processing down and/or up depending upon the load on host IHS 103, in addition or as an alternative to changing bandwidth (e.g., fps/resolution of sensors or camera 108), over-clocking, and/or compute thread management.

For example, HMD 102 of a scalable inside-out SLAM system may: capture video frames (e.g., from WF camera 108), perform image pre-processing operations, select one or more regions-of-interest (ROIs) of a given size (e.g., X*Y pixels smaller than the total frame area), generate object detection of landmarks found in the ROI(s) using feature extraction techniques, and send landmark data to host IHS 103. Host IHS 103 may perform SLAM operations using only the features within the selected ROI(s), and to the exclusion of other features potentially present and/or usable in the area of the captured frame outside the selected ROI(s).

Consumption of host hardware resources (e.g., CPU, GPU, memory, etc.) during operation of xR application 401 is dependent upon the order or dimension of a square covariance matrix of landmark data extracted from the selected ROIs. Particularly, host hardware resource utilization may be dominated by $O(T^2)$, where T is the number of landmarks detected in the selected ROIs: if $T^*$ is smaller than T, then host hardware utilization is reduced by $(T^2 - T^{*2})/T^2 \times 100\%$. For instance, if there are 100 landmarks detected (T=100), but only 50 landmarks are within the selected ROIs and therefore used (T=50), the reduction in resource utilization may be of 75%. By reducing the originally captured frame data to one or more smaller ROIs selected before SLAM module 403 processes the data, systems and methods described herein also effectively reduces the number of landmarks used.

In some embodiments, systems and methods described herein may include a scalable and real-time adaptive host compute modification service or method for inside-out SLAM, without changes to the processing of HMD 102, by performing one or more feature extraction and region of interest (ROI) segmentation techniques that select ROI or landmark regions based on visual range or IR camera frames (e.g., from WF camera 108) that are sent to IHS 103.

Systems and methods described herein may reduce the compute on host IHS 103, for example, by selecting ROIs from down-sampled camera frames, and running SLAM only on those ROIs. As a further optimization operation, these systems and methods may also, for each selected ROI: sort or rank detected landmarks by confidence (e.g., Kalman Gain), probability, or priority; generate a cutoff based upon a desired or expected amount of resource utilization reduction (e.g., compute load) using calibration data; and employ only a selected subset of all available landmarks to generate covariance matrices to be used by SLAM module 403.

During a calibration phase, a number of ROIs (of equal sizes) versus the resulting average resource utilization (e.g., CPU load) of running SLAM on those ROIs is gathered for space 100 where user 101 is engaging in the xR experience, and a calibration curve or table stored in database 402. The method may be repeated with different ROI sizes (e.g., in number of pixels) to get different calibration data. This process establishes a baseline for the space and the HMD-Host combination; and it its generally specific to HMD 102, host IHS 103, and space 100.

The calibration phase may also identify an optimal number M of ROIs of fixed size (can use bigger/smaller size and change N) to use after calibration, in steady-state or normal operation, as the maximum number of ROIs to use for SLAM. For example, user 101 may set a maximum resource utilization value (e.g., for SLAM), which then leads to a different value for N. Otherwise, a default maximum load value may be set.

In normal or steady-state operation, in response to host IHS 103 being loaded due to another xR component (or an application outside of xR) taking up compute resources, the method may determine an M number of ROIs to now compute SLAM on (where M ROIs do not cover entire captured frame), so as to lower the resource utilization. The input to this determination may be a new target CPU load to be under for SLAM compute. The value of M may be continuously modified or adapted in steady-state, based on resource usage monitoring.

In some implementations, each of the selected M ROIs may be obtained from down-sampled camera frames, and then fed to SLAM as if they were "entire frames." A correspond M number of SLAM calls may then feed into rendering engine 406 as a single SLAM Application Programming Interface (API) call.

In various embodiments, systems and methods described herein may limit or decrease the overall frame areas where computationally expensive inside-out SLAM processes are applied. These systems and methods may scale SLAM without degrading user experience, and therefore are favored over industry-sanctioned overclocking or thread management techniques. Furthermore, these systems and methods may leverage existing SLAM processing and cameras without rendering application modifications, and scale to allow SLAM on lower end-host IHSs.

Figure 5:
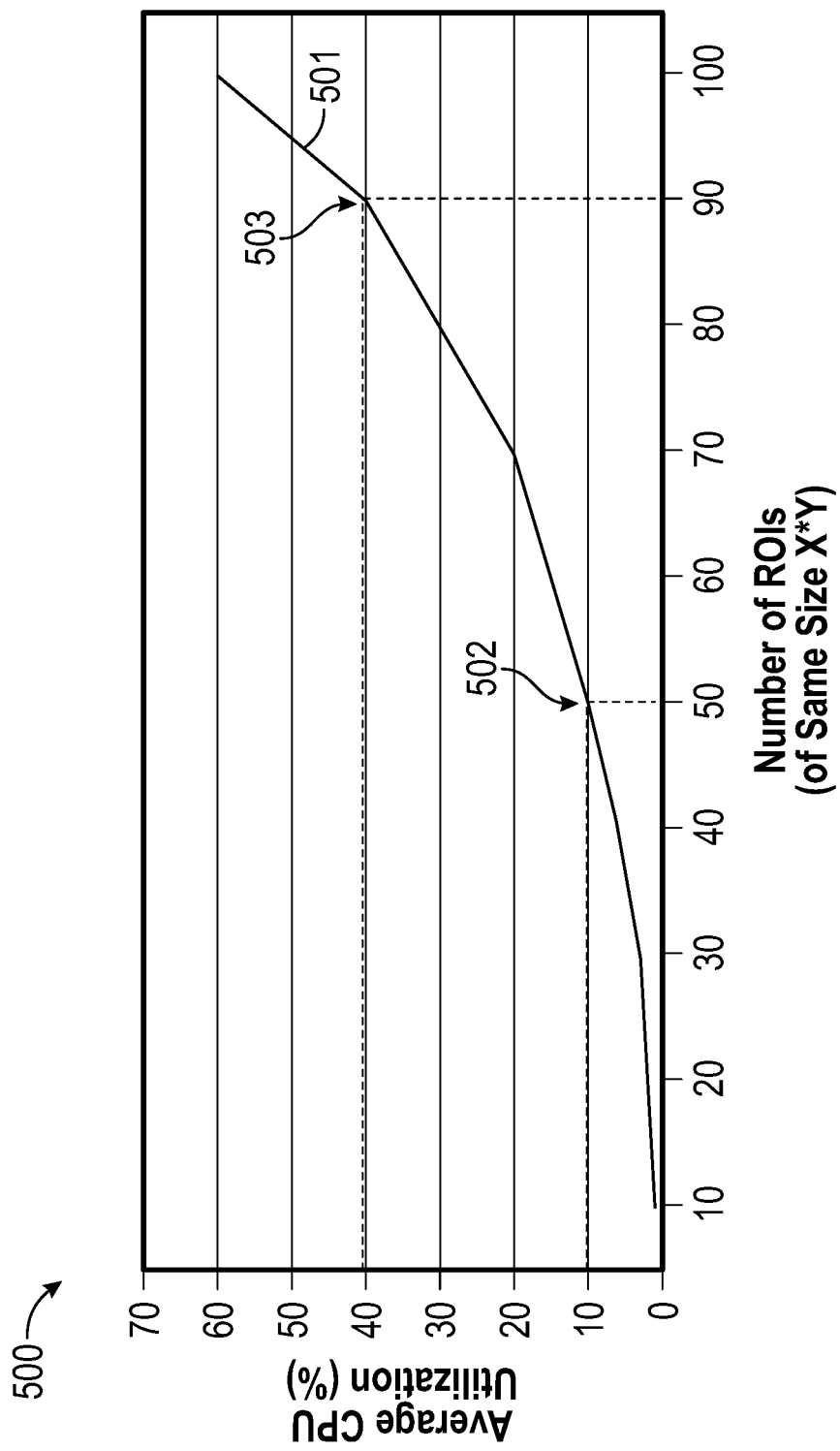
FIG. 5 illustrates an example of a calibration method according to some embodiments.

FIG. 5 illustrates an example of a calibration method. In various embodiments, calibration curve 501 may be produced by executing xR application 401 with different numbers of ROIs and measuring resource utilization as a function of the number of ROIs. The process may be repeated with ROIs of different X*Y sizes, to produce calibration curves for different combinations of N and X*Y.

In this example, a calibration of number of ROIs versus average CPU load is performed, and calibration curve 501 is stored in database 402. In some cases, calibration curve 601 may be stored in database 402 in table form. As such, calibration curve or table 501 provides a baseline for the space and the HMD-host IHS combination; but it should be noted that the process is specific to an HMD, the host IHS being used and the environment. Calibration may also be used to select an optimal number of ROIs to use in steady state as the maximum number of ROIs (M) to compute.

In use-case 502, a user may set the maximum permitted CPU load for SLAM at 10%, which limits the number of ROIs to 50. Conversely, in use-case 503, if the user does not set the maximum permitted CPU load for SLAM, a nominal maximum CPU load may be chosen as 40% at driver install time on the host IHS, and the maximum number of ROIs (M) is set to 90.

Figure 6:
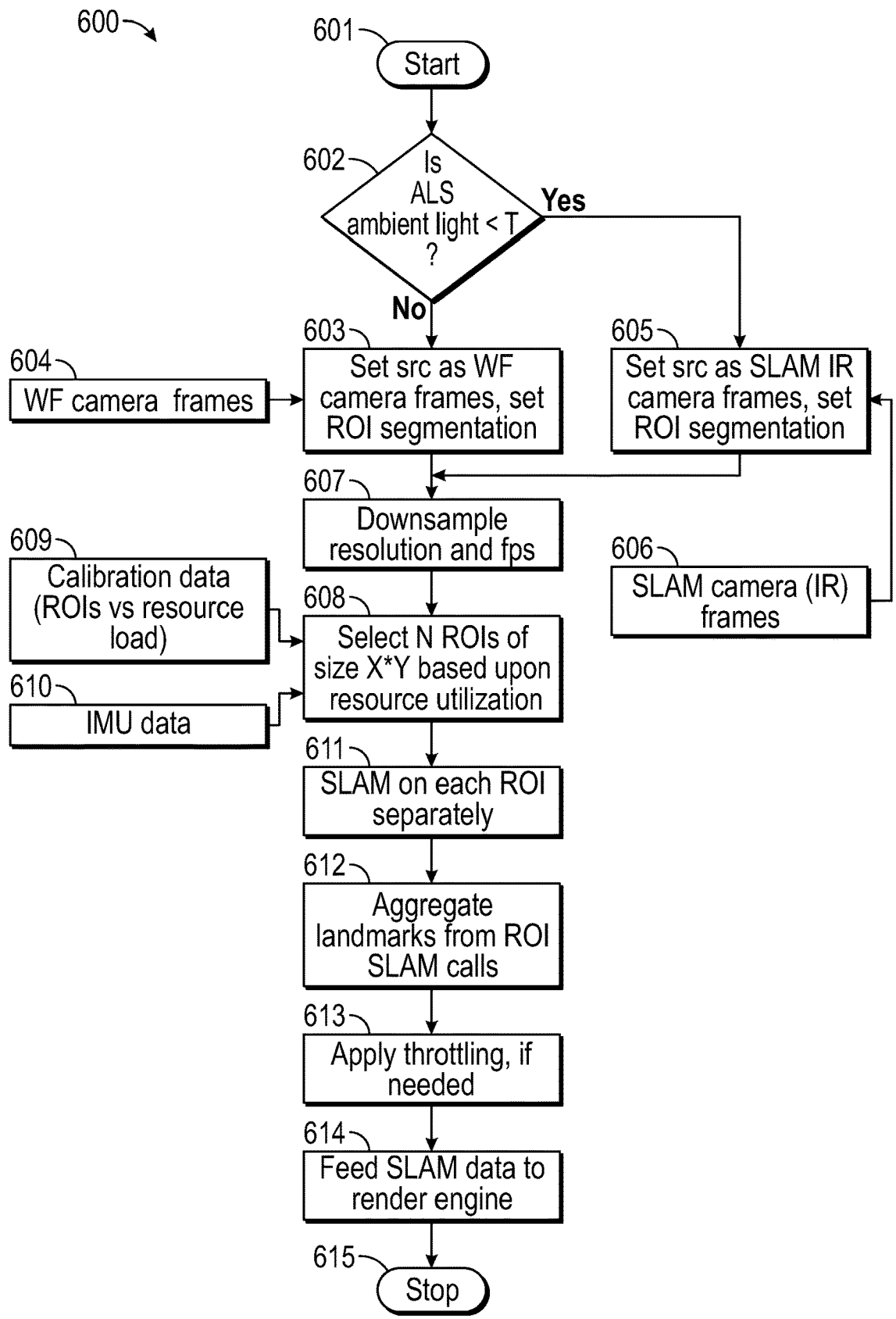
FIG. 6 illustrates an example of an adaptive Simultaneous Localization and Mapping (SLAM) method, according to some embodiments.

FIG. 6 illustrates an example of a method for providing adaptive SLAM using world-facing cameras in xR applications. In some embodiments, method 600 may be performed by resource management module 408 in cooperation with xR application 401 and SLAM module 403 using program instructions and/or other information stored in database 402.

Particularly, method 600 starts at block 601. At block 602, method 600 determines whether the ambient light level, as detected by an ambient light sensor (ALS) among sensor(s) 202, is below a threshold level. If not, block 603 sets the SLAM source for module 403 as a visual spectrum camera (e.g., WF camera 108), sets an ROI segmentation method suitable for the visible spectrum, and receives RGB camera frames 604. If so, block 605 sets the SLAM source for module 403 as an IR spectrum camera (e.g., WF camera 108), sets an ROI segmentation method suitable for the IR spectrum, and receives IR camera frames 606.

At block 607, method 600 may downsample frames 604 and/or 606 by reducing their pixel resolution and/or the number of frames-per-second (fps). In some cases, an image compression algorithm may be applied to frames 604 and/or 606 to produce a downsampled images using selected compression or data reduction parameters.

At block 608, method 600 may select a number of ROIs of a same size X*Y to be processed by SLAM module 403 based upon calibration data 609 (e.g., curve(s) 501 in FIG. 5) and/or IMU data 610. For example, N may be selected to maintain the utilization of the IHS resource below a predetermined value. Block 608 may identify an increase in utilization of a hardware resource, and it may reduce N to avoid reaching a maximum utilization level (M). Conversely, block 608 may identify a decrease in utilization of the hardware resource, and it may increase N without reaching M.

In some cases, a subset of ROIs may be selected based upon a user's gaze vector, point, and/or direction. For example, if two ROIs are identified but only one ROI can be used in order to keep utilization below a maximum level, then the ROI(s) that most closely matches the user's gaze direction may be chosen as the ROI to be used for SLAM.

When calibration curve 501 is generated for different sizes of ROIs—that is, different number of X and/or Y pixels in each ROI—the number of pixels X*Y and/or the size of the ROIs may also may selected to control the utilization of the hardware resource. In that case, block 608 may identify an increase in utilization of a hardware resource, and it may reduce the number of pixels or size of the ROIs to avoid reaching the maximum utilization level (M). Conversely, block 608 may identify a decrease in utilization of the hardware resource, and it may increase the number of pixels or size of the ROIs without reaching M.

At block 611, method 600 performs SLAM processing upon each selected ROI separately using SLAM API calls into SLAM module 403 (e.g., one API call for each selected ROI). At bock 612, method 600 aggregates landmarks found in the processed ROIs.

Then, at block 613, method 600 further throttles the number of landmarks used, if needed. For example, if after operation of block 608 the hardware resource utilization still remains at undesirable levels, the number of landmarks extracted from the selected N ROIs (already reduced in comparison with the originally captured frames) may be further reduced by tracking only the top landmarks with highest associated Kalman Gains in the ROI (another calibration procedure may be performed to correlate the number of landmarks tracked with a corresponding reduction or increase in hardware resources).

Block 614 of method 600 then feeds the output of SLAM module 403 to rendering engine 406, and method 600 ends at block 615.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
  select one or more regions-of-interest (ROIs) within an image captured by a camera mounted on a Head-Mounted Display (HMD) worn by a user in a physical environment during execution of a virtual, augmented, or mixed reality (xR) application;
  monitor utilization of an IHS resource while the IHS performs a Simultaneous Localization and Mapping (SLAM) process on the one or more ROIs; and
  modify a number of the one or more ROIs while the IHS performs the SLAM process to store a calibration curve or table that associates different numbers of ROIs with a level of utilization of the IHS resource;
  select at least one ROI within the image; and
  manage utilization of the IHS resource, at least in part, by creating a map of the physical environment and tracking a location of the HMD using the at least one ROI to the exclusion of another portion of the image.

2. The IHS of claim 1, wherein the at least one ROI is selected to maintain the utilization of the IHS resource below a predetermined value.

3. The IHS of claim 2, wherein the calibration curve or table associates a reduction in a number of ROIs with a corresponding reduction in utilization of the IHS resource.

4. The IHS of claim 3, wherein the program instructions, upon execution, further cause the IHS to:
identify an increase in utilization of the IHS resource; and
reduce the number of the at least one ROI to avoid reaching a maximum utilization level.

5. The IHS of claim 2, wherein the calibration curve or table associates an increase in a number of ROIs with a corresponding increase in utilization of the IHS resource.

6. The IHS of claim 5, wherein the program instructions, upon execution, further cause the IHS to:
identify a decrease in utilization of the IHS resource; and
increase the number of the at least one ROI without reaching a maximum utilization level.

7. The IHS of claim 1, wherein the at least one ROI comprises a plurality of pixels selected to maintain the utilization of the IHS resource below a predetermined amount.

8. The IHS of claim 7, wherein the calibration curve or table associates a reduction in the number of pixels with a corresponding reduction in utilization of the IHS resource.

9. The IHS of claim 8, wherein the program instructions, upon execution, further cause the IHS to:
identify an increase in utilization of the IHS resource; and
reduce the number of pixels of the at least one ROI to avoid reaching a maximum utilization level.

10. The IHS of claim 7, wherein the calibration curve or table associates an increase in the number of pixels with a corresponding increase in utilization of the IHS resource.

11. The IHS of claim 10, wherein the program instructions, upon execution, further cause the IHS to:
identify a decrease in utilization of the IHS resource; and
increase the number of pixels of the at least one ROI without reaching a maximum utilization level.

12. A method, comprising:
selecting one or more regions-of-interest (ROIs) within an image captured by a camera mounted on a Head-Mounted Display (HMD) worn by a user in a physical environment during execution of a virtual, augmented, or mixed reality (xR) application;
monitoring utilization of a resource while an Information Handling System (IHS) performs a Simultaneous Localization and Mapping (SLAM) process on the one or more ROIs;
modifying a number of the one or more ROIs used while the IHS performs the SLAM process to store a calibration curve or table that associates different numbers of ROIs with a level of utilization of the resource;
selecting at least one ROI within the image; and
managing utilization of the resource, at least in part, by creating a map of the physical environment and tracking a location of the HMD using the at least one ROI to the exclusion of another portion of the image.

13. The method of claim 12, further comprising using a selected number of ROIs that results in a selected level of utilization of the resource based upon the calibration curve or table.

14. The method of claim 13, further comprising:
identifying an increase in the level of utilization of the resource; and
reducing the number of one or more ROIs used to avoid reaching a maximum level.

15. The method of claim 14, further comprising:
identifying a decrease in the level of utilization of the resource; and
increasing the number of one or more ROIs used without reaching the maximum level.

16. The method of claim 12, further comprising modifying a number of pixels within each of the one or more ROIs, and storing another calibration curve or table that associates different sizes of each ROI with a level of utilization of the resource.

17. The method of claim 16, further comprising using a selected number of pixels for each of the one or more ROIs that results in a selected level of utilization of the resource based upon the calibration curve or table.

18. The method of claim 17, further comprising:
identifying an increase in the level of utilization of the resource; and
reducing the size of each of the one or more ROIs to avoid reaching a maximum resource utilization level.

19. The method of claim 18, further comprising:
identifying a decrease in the level of utilization of the resource; and
increasing the size of each of the one or more ROIs without reaching the maximum resource utilization level.

20. A hardware memory device having program instructions stored thereon that, upon execution by a processor of an Information Handling System (IHS), cause the IHS to:
select one or more regions-of-interest (ROIs) within an image captured by a camera mounted on a Head-Mounted Display (HMD) worn by a user in a physical environment during execution of a virtual, augmented, or mixed reality (xR) application;
monitor utilization of an IHS resource while the IHS performs a Simultaneous Localization and Mapping (SLAM) process on the one or more ROIs; and modify a number of the one or more ROIs while the IHS performs the SLAM process to store a calibration curve or table that associates different numbers of ROIs with a level of utilization of the IHS resource;
select at least one ROI within the image; and
manage utilization of the IHS resource, at least in part, by creating a map of the physical environment and tracking a location of the HMD using the at least one ROI to the exclusion of another portion of the image.

* * * * *